(12) United States Patent
Benölken

(10) Patent No.: US 10,508,764 B2
(45) Date of Patent: Dec. 17, 2019

(54) COMPOSITE TUBE FOR REPAIRING LEAKY FLUID LINES, METHOD FOR PRODUCING SUCH A COMPOSITE TUBE AND METHOD FOR REPAIRING LEAKY FLUID LINES WITH A COMPOSITE TUBE

(71) Applicant: CUYLITS HOLDING GMBH, Bersenbrück (DE)

(72) Inventor: Ansgar Benölken, Wildeshausen (DE)

(73) Assignee: Cuylits Holding GmbH, Bersenbruck (DE)

( * ) Notice: Subject to any disclaimer, the term of this patent is extended or adjusted under 35 U.S.C. 154(b) by 100 days.

(21) Appl. No.: 15/566,388

(22) PCT Filed: Apr. 13, 2016

(86) PCT No.: PCT/DE2016/100175
§ 371 (c)(1),
(2) Date: Oct. 13, 2017

(87) PCT Pub. No.: WO2016/165693
PCT Pub. Date: Oct. 20, 2016

(65) Prior Publication Data
US 2018/0128413 A1    May 10, 2018

(30) Foreign Application Priority Data
Apr. 14, 2015   (DE) .................. 10 2015 105 668

(51) Int. Cl.
*F16L 55/165*    (2006.01)
*B32B 1/08*    (2006.01)
(Continued)

(52) U.S. Cl.
CPC ............ *F16L 55/1656* (2013.01); *B32B 1/08* (2013.01); *B32B 5/024* (2013.01); *B32B 5/026* (2013.01);
(Continued)

(58) Field of Classification Search
CPC .................... F16L 55/1656; F16L 55/1651
(Continued)

(56) References Cited

U.S. PATENT DOCUMENTS

| 6,170,531 B1 | 1/2001 | Jung et al. |
| 6,270,289 B1 | 8/2001 | Einhaus et al. |

(Continued)

FOREIGN PATENT DOCUMENTS

| DE | 19852690 A1 | 11/1998 |
| DE | 19852690 A1 | 5/2000 |

(Continued)

OTHER PUBLICATIONS

International Search Report (in German with English Translation) for PCT/DE2016/100175, dated Jul. 4, 2016; ISA/EP.

*Primary Examiner* — Patrick F Brinson
(74) *Attorney, Agent, or Firm* — Harness, Dickey & Pierce, P.L.C.

(57) ABSTRACT

A composite tube is presented for repairing leaky fluid lines, consisting of a tubular glass fibre textile produced by a knitting method or a weaving method and of a film fully and sealingly surrounding this glass fibre textile, which tube is wherein the film on its inside facing the surface of the glass fibre textile has a coating of hotmelt adhesive that is meltable at least partially by a thermal treatment, via which the film is cohesively bonded to the glass fibre textile. The invention further relates to a method for producing a composite tube suitable for repairing leaky fluid lines and to a method for repairing leaky fluid lines with a composite tube of the invention.

19 Claims, 3 Drawing Sheets

Figure 1:
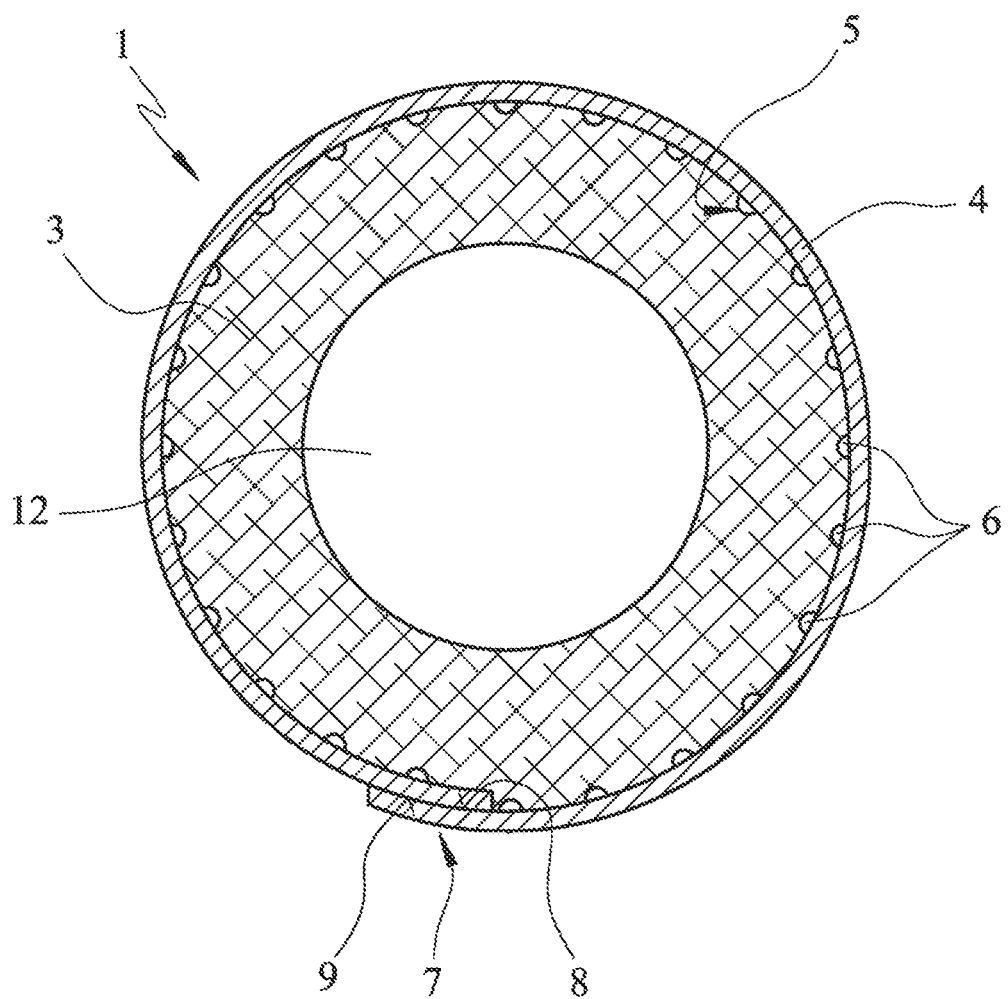

(51) Int. Cl.
*B32B 5/24* (2006.01)
*B32B 7/14* (2006.01)
*B32B 27/06* (2006.01)
*B32B 5/02* (2006.01)
*B32B 7/12* (2006.01)

(52) U.S. Cl.
CPC ................. *B32B 5/24* (2013.01); *B32B 7/12* (2013.01); *B32B 7/14* (2013.01); *B32B 27/06* (2013.01); *F16L 55/1651* (2013.01); *B32B 2260/021* (2013.01); *B32B 2260/046* (2013.01); *B32B 2262/101* (2013.01); *B32B 2597/00* (2013.01)

(58) Field of Classification Search
USPC ..................................................... 138/97, 98
See application file for complete search history.

(56) References Cited

U.S. PATENT DOCUMENTS

| | | | | |
|---|---|---|---|---|
| 6,296,729 | B1* | 10/2001 | Kamiyama | B29C 65/505 138/98 |
| 6,374,862 | B1* | 4/2002 | Schwert | F16L 55/1656 138/98 |
| 6,615,875 | B2 | 9/2003 | Adolphs et al. | |
| 2003/0029018 | A1 | 2/2003 | Schwert et al. | |
| 2004/0163724 | A1* | 8/2004 | Trabbold | C03C 25/24 138/149 |
| 2008/0277012 | A1 | 11/2008 | Anders et al. | |
| 2010/0075078 | A1 | 3/2010 | Quitter | |
| 2010/0212766 | A1* | 8/2010 | Kiest, Jr. | F16L 55/1653 138/98 |
| 2010/0282351 | A1* | 11/2010 | Kanniyama | F16L 55/1654 138/98 |
| 2013/0126029 | A1 | 5/2013 | Hummel | |
| 2014/0076448 | A1* | 3/2014 | Duttenhoefer | F16L 11/042 138/98 |
| 2014/0116566 | A1 | 5/2014 | Bader et al. | |
| 2015/0068632 | A1* | 3/2015 | Onishi | B29C 63/34 138/97 |
| 2015/0328857 | A1 | 11/2015 | Ueda et al. | |

FOREIGN PATENT DOCUMENTS

| | | |
|---|---|---|
| DE | 102009038628 A1 | 3/2011 |
| DE | 102009038628 A1 | 3/2011 |
| DE | 102010023764 A1 | 12/2011 |
| DE | 102010023764 A1 | 12/2011 |
| DE | 102010051484 A1 | 5/2012 |
| DE | 202012104166 U1 | 1/2013 |
| DE | 102012110265 A1 | 4/2014 |
| DE | 102012110265 A1 | 4/2014 |
| DE | 102014104884 A1 | 10/2014 |
| EP | 0523090 B1 | 12/1995 |
| EP | 0875713 B1 | 4/1998 |
| EP | 0875713 A2 | 11/1998 |
| EP | 2573442 A1 | 3/2013 |
| EP | 2777925 A1 | 9/2014 |
| EP | 2835395 A1 | 2/2015 |
| EP | 2933091 A1 | 10/2015 |
| EP | 2933091 A1 | 10/2015 |
| WO | 00/25057 A1 | 5/2000 |
| WO | WO-2000025057 A1 | 5/2000 |
| WO | WO-2014088053 A1 | 6/2014 |

* cited by examiner

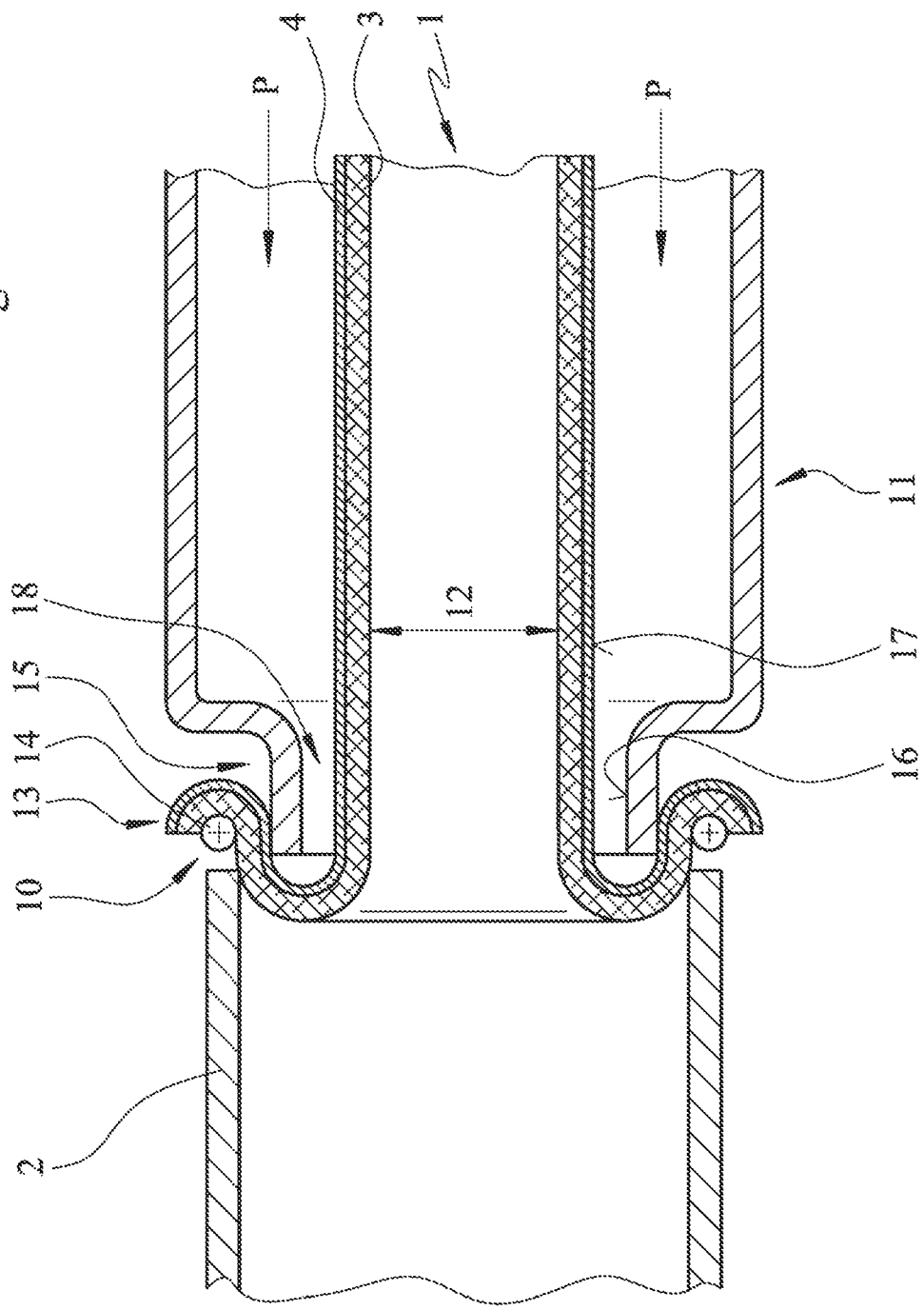

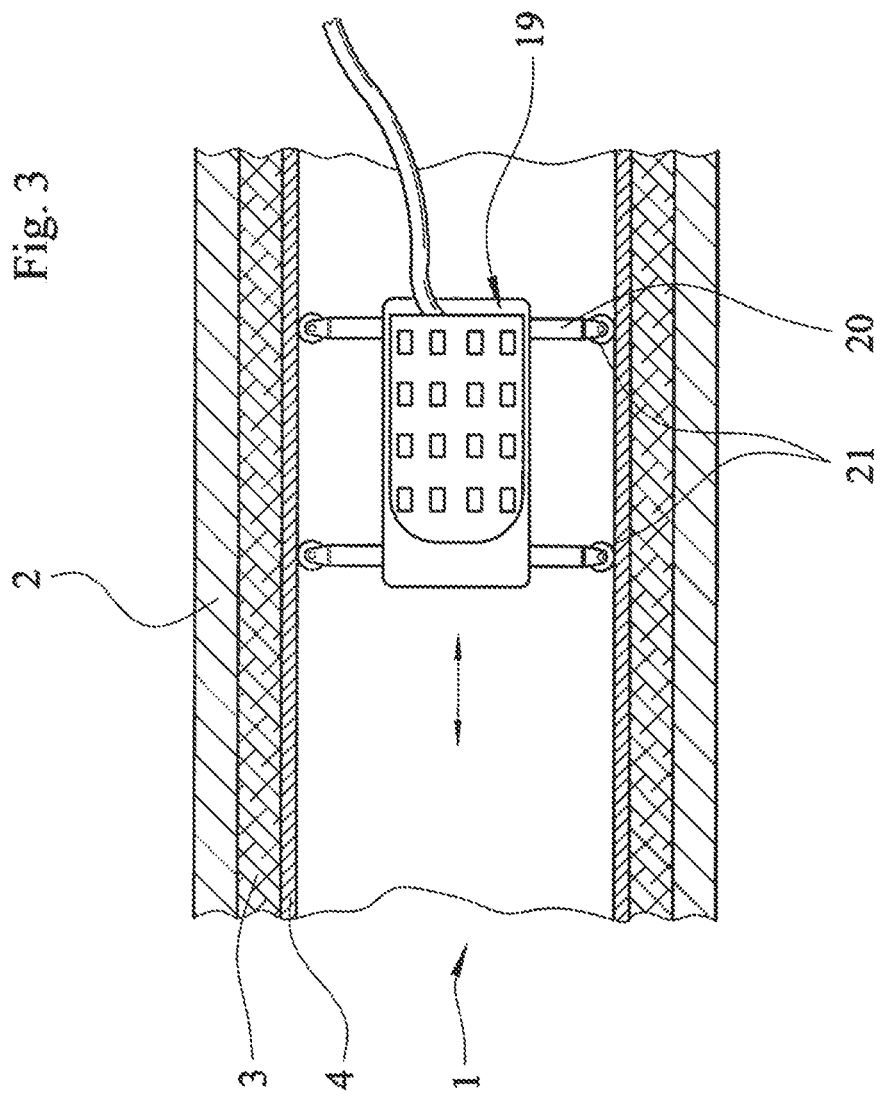

COMPOSITE TUBE FOR REPAIRING LEAKY FLUID LINES, METHOD FOR PRODUCING SUCH A COMPOSITE TUBE AND METHOD FOR REPAIRING LEAKY FLUID LINES WITH A COMPOSITE TUBE

CROSS REFERENCE TO RELATED APPLICATIONS

This application is a U.S. National Phase Application under 35 U.S.C. 371 of International Application No. PCT/DE2016/100175 filed on Apr. 13, 2016 and published in German as WO 2016/165693 A1 on Oct. 20, 2016. This application claims priority to German Application No. 10 2015 105 668.2 filed on Apr. 14, 2015. The entire disclosures of all of the above applications are incorporated herein by reference.

The invention relates to a composite tube for repairing leaky fluid lines, a method for producing such a composite tube, and a method for repairing leaky fluid lines with such a composite tube.

The generic term "fluids" is generally understood to refer to gases and liquids that are transported in fluid lines suitable for this purpose. Examples of such lines also include, for example, water level lines or gravity lines. In order to prevent infiltrations or exfiltrations due to water undermining and to avoid fluid losses or accidents, such as those that may occur due to defective gas lines, for example, it is vitally important for such fluid lines to be 100% sealed for a long period of time. However, as fluid lines are at least partially laid in the ground, they are exposed to increased wear due to soil displacement occurring over time, with the result that damage and leaks can occur in the fluid lines even when all possible precautionary measures are taken. Relaying of the lines is always highly complex, and depending on the environmental conditions, even impossible in some cases. For this reason, various methods have recently been developed for repairing damaged fluid lines.

For example, EP 0875713 B1 discloses a lining material that is used for restoration of a fluid line and is composed of a seamless plush textile material having a coaxial, freely moveable film tube surrounding it. The circular knit plush, which is preferably produced seamlessly by a circular knitting process, constitutes a knitted fabric that is saturated prior to insertion of the lining material into the fluid line with an impregnating agent that is cured under the effect of UV light in the form of a resin composition. After saturation of the plush textile material, the lining material is blown into the fluid line with excess pressure and adheres due to the given pressure to the internal wall of the fluid line to be renovated. According to the disclosed content of this document, curing of the impregnating agent is carried out by UV irradiation, wherein a UV light source is finally guided through the fluid line filled with the lining material. The plush textile material can be composed of various materials. Mentioned as examples in EP 0875713 B1 are polyester, aramid, polyamide, kevlar, polyurethane or glass fibers, or mixtures of said materials.

However, this solution has been found to be disadvantageous in that production of the plush textile material is relatively complex and additionally in that during laying of the lining material, a fold formation is frequently observed, which can be attributed to the freely moveable accommodation of the plush textile material in the film tube. More particularly, fold formation becomes more pronounced in the areas of bends and curves of the fluid line to be renovated, so that a satisfactory overall result cannot be achieved.

Moreover, DE 102010023764 A1 generally discloses a multilayer film of the type used for restoration of underground fluid lines. In this case, a supporting material is used that is surrounded by a plurality of layers. According to the disclosed content of this document, the supporting material is saturated with a reactive plastic resin and is provided with an internally and externally placed tube film. In this process, the plastic resin can also be cured using UV irradiation, and it must be noted here that the structure of this multilayer film is highly complex, so that the presented method for repairing a fluid line appears to be relatively cost-intensive.

A similar solution with similar drawbacks is disclosed in DE 102012110265 A1. A material for coating a fluid line is described in the context of restoration of defective sewers, in which a coating material is used that has a textile layer saturated with a curable resin. An external film and an internal film are also present, wherein the internal film is removed again after application of the coating material. An external protective film, referred to as a "preliner," is also provided as UV protection, said film being installed before insertion of the coating material in the fluid line. After the coating material is positioned in the fluid line, it is treated from inside, for example with steam, so that the coating material lies on the internal wall of the fluid line. The resin is then cured by means of UV light or application of heat.

Finally, a composite tube for use in repairing sewers is also known from DE 19852690 A1, in which a tube is turned inside out inside another tube using compressed air. The composite tube produced in this manner further has an inner layer impregnated with resin and an externally and internally placed impermeable layer in the form of a film. Curing of the resin is carried out using a heated pressure medium, i.e. under the effect of heat, as was also the case in the above-described document. This solution also requires considerable production and energy expense and is thus cost-intensive.

A common feature of the fluid line repair methods commonly used today is that the tube material is only saturated with the curable resin on the spot, i.e. at the construction site, which results in a relatively long processing time (pot life), with a period of up to 2 hours or more possibly elapsing before the resin is fully cured in some cases. Such a situation is of course unacceptable. In addition, it should be noted that many of the repair methods commonly used today are suitable only for fluid lines of relatively large diameter. In the range of smaller fluid line diameters, i.e., for example, for fluid lines having a diameter of between 80 mm and 200 mm, these methods cannot be used at all or can be used only to a highly limited extent.

The object of the invention is to provide a composite tube for repairing leaky fluid lines that has a simple structure, is as free of folds as possible, and can be laid within a brief processing time in fluid lines of various, and more particularly smaller, diameters. In addition, a method for producing such a composite tube and a method for repairing leaky fluid lines with such a composite tube are provided.

The invention achieves this task by means of the features of independent claims 1, 12 and 13.

Further embodiments of the invention are the subject matter of the subsequent dependent claims.

A composite tube for repairing leaky fluid lines, consisting of a tubular glass fiber textile produced by a knitting method or a weaving method and of a film fully and sealingly surrounding this glass fiber textile, was developed according to the invention such that the film, on its inner side facing the surface of the glass fiber textile, has a coating of hotmelt adhesive that is at least partially meltable by a thermal treatment, via which the film is cohesively bonded to the glass fiber textile.

By means of the invention, a cohesive bond is at least partially formed between the film and the glass fiber textile, which allows a simple configuration and improved laying of the composite tube for the first time in a fold-free manner. Of course, depending on the density of the coating of hotmelt adhesive present, this does not exclude complete cohesive bonding, i.e. over the entire surface, between the film and glass fiber textile, and such bonding is therefore within the scope of the invention. The glass fiber textile can be used in both reinforced and non-reinforced form, wherein the glass fiber textile is externally laminated with the film to form the composite tube. In this case, the glass fiber textile shows multiaxial extensibility, and in addition is both workable and shapable, which provides a decisive advantage with respect to its processing characteristics for the purpose according to the invention.

Accordingly, in contrast to other sheet-like materials, the glass fiber textile according to the invention can preferably be configured to show asymmetrical stretching behavior characterized in that changes in length in the longitudinal (axial) direction of more than 100% on application of a high degree of force and changes in length in the transverse (radial) direction of more than 150% on application of a low degree of force. The composite tube according to the invention is also capable of compensating for and compressing excess material, caused for example by a channel floor, without resulting in any significantly apparent folds or material warping.

Moreover, a preferred feature according to the invention of the described glass fiber textile is its constant material thickness when used either in a raw state or according to its intended application. As a rule, a change in length, i.e. an extension, is accompanied by a reduction in material thickness, which can lead to thin areas and thus weak areas. The lining material according to the invention shows a uniform material thickness based on the selected design parameters. This is of particular importance to the user, as the thickness may not be less than preset values in many cases.

The elasticity of the composite tube, which is advantageous for implementation of the invention, is achieved more particularly in that the glass fiber textile is produced by means of a knitting method or a weaving method, wherein the so-called "interlock method" is preferably used. The term "interlock" is understood to refer to a certain knitting method. In this method, the fibers are not woven crosswise, but are intertwined with one another. Here, the fibers are knitted on two rows of needles. The rows of needles operate opposite each other and alternatingly (right-to-right method). In this case, both the upper side and underside are always knitted on the same side and to the right. This results in stitch formation that is also referred to as a "right-to-right" weave. This type can be understood as a combination of two right-to-right connections. Here, the basic binding element is the stitch. The properties required for achieving the action according to the invention can be achieved by properly selecting the material and process parameters.

With respect to the film, it should be noted that according to the invention, this is preferably a flexible barrier film, which means that the film possesses a sealing layer. This is naturally preferred whenever the term "glass fiber textile" is used in connection with the invention. However, both composite materials with glass fibers or other fiber materials can be used which are suitable for the purpose according to the invention. Particularly preferred in this case are corrosion-resistant E-CR glass fibers. The fiber materials preferably used for production have a fineness of 200-2400 tex, and preferably 400-1000 tex, and may be present in the form of a roving, yarn, or twine. In production of the textile tube by means of the above-mentioned fiber materials, a stitch number of 20-100 stitches per 10 cm within a stitch row of the knit fabric is preferred.

In a first embodiment of the invention, the glass fiber textile is a seamless and preferably endless tube, which is produced for example by a circular knitting process and cut to size as needed. The circular knitting process has been found to be highly advantageous for a glass fiber textile of this type, as the required manufacturing costs are low and it provides the elasticity of the composite tube required for implementing the invention.

Experiments have further shown that the coating of hotmelt adhesive of the unprocessed film advantageously allows optimum bonding between the glass fiber textile and the film if the film has a plurality of spheroidal or diamond-shaped projections on one of its sides. It has been found here that the partial cohesive bonding, which preferably takes place only in the areas of the spheroidal or diamond-shaped projections between the glass fiber textile and the film, allows low relative movement between the film and glass fiber textile, although the two elements are indeed cohesively bonded to each other. More particularly, this situation allows the fold-free laying of the composite tube inside the fluid line to be repaired mentioned above.

The coating of hotmelt adhesive of the film, i.e. the application of the projections to one side of the film, is advantageously carried out by means of gravure roller coating. This method allows high-quality production of the film suitable for further processing into a composite tube.

The invention further proposes that the glass fiber textile is cohesively bonded to the coating of hotmelt adhesive via a thermally applied rolling process in a temperature range of between 70° C. and 90° C. In this method, the film is simultaneously converted to a tube shape adapted to the glass fiber textile and bonded to the glass fiber textile. In the above-mentioned temperature range, the projections of the coating of hotmelt adhesive melt and thus produce the partially cohesive bond between the glass fiber textile and the film. The film is laminated in this process, which can take place, for example, by means of an ultrasound welding process. The ultrasound welding process can be implemented within a short period of time. This gives rise to a vitally important advantage in production technology of this solution according to the invention.

As the film consists of an originally sheetlike material, it must be placed around the tubular glass fiber textile in order to bond therewith. This measure results in a joining seam that must be closed, so that the film arranged around the glass fiber textile preferably has an overlapping area in which a section of the inner surface of the film lies on a corresponding section of the outer surface of the film. According to a further proposal of the invention, at least one of these surface sections of the film has a thermoplastic adhesive film for the production cohesive bonding of the film in the overlapping area of the surfaces formed thereby. This thermoplastic adhesive film, which is preferably produced based on copolyamides and modified polyolefins, can be processed without difficulty while forming a seal. Moreover, the above-described cohesive bond is particularly suitable for forming a seal in the overlapping area.

In addition to a single-layer configuration of the adhesive film, a thermoplastic adhesive film with a plurality of layers is advantageous according to an embodiment of the invention, for example, when there are particular requirements with respect to the strength or sealing of the overlapping area.

In this case, the thermoplastic adhesive film preferably has a melting range above 115° C., which has a highly favorable effect on its processability. From this temperature range upward, for example, an adhesive film of this type can be melted in a simple manner, e.g. by means of an ultrasound and/or heat impulse sealing process, so that the overlapping area is thus closed while forming a seal.

The method according to the invention for producing a composite tube suitable for repairing leaky fluid is characterized by comprising the following method steps:

provision of an initially flat film that is cut to size which has a plurality of spheroidal or diamond shaped projections forming a coating of hotmelt adhesive on one side, application of a tubular glass fiber textile produced by a knitting method or a weaving method to the side of the film provided with the coating of hotmelt adhesive, cohesive bonding of the film to the glass fiber textile via a thermally applied rolling process in a temperature range of between 70° C. and 90° C., by means of which the film is adapted to the tube shape of the glass fiber textile, production of cohesive bonding of an overlapping area of the film by means of an ultrasound and/or heat impulse sealing process, for which purpose the overlapping area is composed of a section of the inner surface of the film that comes to lie on a corresponding section of the outer surface of the film and at least one of these surface sections of the film in the overlapping area of the surfaces has a thermoplastic adhesive film having a melting range above 115° C.

The method presented allows the production of a composite tube in a few steps and is therefore impressively simple from the standpoint of production. The composite tube consists only of a film and the glass fiber textile, and thus itself constitutes an item that can be processed without problems. It can be made available as piece goods and is preferably provided in this form as a prefabricated item. In this manner, the entire composite tube is very simple to transport and subject to further processing as needed.

A further method according to the invention for repairing leaky fluid lines with a composite tube according to the invention is characterized by comprising the following method steps:

making of an opening in the fluid line and localization or identification of the damage present in the fluid line, provision of a length of a composite tube required for the repair, consisting of a glass fiber textile and a transparent film bonded cohesively thereto and enclosing the glass fiber textile, wherein the glass fiber textile is first saturated with a styrene-free unsaturated polyester resin that is curable by UV irradiation, fixation of an open end of the composite tube to an inversion device, production of a sealed bond between the opening of the fluid line and the composite tube, insertion of the composite tube into the fluid line or application of excess pressure produced in the inversion device to the composite tube, thus causing the composite tube to be blown into the fluid line to be repaired, wherein as a result of the given pressure, the composite tube lies directly against the inner surface of the fluid line, and production of UV irradiation at least once over the entire length of the composite tube by means of an UV emitter guided at least once through the composite tube so that the polyester resin is cured.

With respect to inversion or insertion behavior, it is preferably possible to introduce the glass fiber material impregnated in resin at the lowest air pressure possible, for example in order to save energy. At the same time, it must be possible for the user to insert the composite tube into the fluid line to be restored in a controlled and form-fitting manner. The composite tube according to the invention allows the user to use an air pressure of 250-500 mbar. Higher air pressures are not required, but pressures of up to 1200 mbar can be used. In addition, a preferred feature according to the invention of the composite tube is the precisely defined boundary between elastic and plastic deformation. This boundary is preferably in a range from 300-450 mbar.

In this case, the use of a styrene-free polyester resin has a decisive advantage over the two-component epoxy resins used to date in that said resin has an extremely short curing time. The epoxy resins used in the past required times of 2 hours or more, during which it was impossible to continue activities at the construction site. With respect to the reactive resins to be used, thermoplastic materials such as polyamide, polyolefins, and polyester, as well as fluoropolymers, are preferred for the composite tube.

In addition, in the polyester resins used here, complex mixing carried out locally, i.e. at the construction site, can be dispensed with, which also plays a considerable role in shortening processing times. For example, the composite tube according to the invention can be saturated with the polyester resin beforehand and delivered directly to the construction site in this prefabricated configuration. The use of a UV emitter offers considerable economic and energy-saving advantages over the curing procedures predominantly used in the past. For example, particular energy savings are achieved in that an LED lamp which emits UV light of the required spectrum is used as a UV emitter. Such LED lamps consume very little energy, but are extremely effective in their radiation intensity and thus highly efficient.

In a manner known per se, a camera is first allowed to inspect the fluid line and precisely document the damage present before beginning to repair a fluid line. Today, such camera inspections can be carried out, for example, using miniaturized robots. During optical examination of the fluid line, localization of the damage present inside the fluid line is simultaneously carried out in an appropriate manner. For this purpose, measurement of the portions of the fluid line to be repaired is likewise carried out during inspection of the fluid line. The recorded values can be stored in a central processing unit, or to put it in simpler terms, a computer, optionally optically displayed, and suitably evaluated for further processing of the fluid line.

The above-mentioned prefabrication of the composite tube can be improved to a considerable degree if the composite tube is provided wound onto a drum as piece goods. Winding onto a drum allows the composite tube to be transported in a very simple manner and then unwound from the drum for insertion into the fluid line. Consequently, this measure makes it possible to substantially automate the repair of the fluid line.

During blowing of the composite tube into the fluid line, the tube is turned inside out, so that the inner side of the composite tube originally formed by the glass fiber textile lies against the inner wall of the fluid line and the film then forms the inner side of the repaired fluid line.

In an alternative method to this, the composite tube is pulled into the fluid line. The measures required for this purpose are known to the person skilled in the art. However, this method of introducing the composite tube into the fluid line is less gentle to the surface of the composite tube than the preferred variant of blowing in.

A particular advantage is achieved with respect to improving the inversion behavior of the composite tube if the composite tube is preheated for example to a temperature between 20° C. and 40° C., preferably 30° C., before it is inserted into the fluid line. Heating of the composite tube inside the drum can be carried out, for example, by electrical heating of the drum accommodating the composite tube.

In this connection, when one speaks of prefabrication of the composite tube wrapped around a drum as piece goods, this is to be understood to mean that the composite tube has already been saturated with the polyester resin before being wrapped around the drum and thus before being delivered to the construction site. As the polyester resin according to the invention is not sensitive to UV light, measures must be taken to protect the prefabricated composite tube inside the drum from UV light. In the simplest case, such a measure may consist of enclosing the drum in a light-protected capsule. In another variant, the tube as a whole is accommodated in a packaging tube, which is removed before processing of the composite tube.

Depending on the status of the environment of the fluid line to be repaired, it may happen that areas of heavy rust damage or bulging areas are present inside the fluid line, or for example, that root ends have penetrated into the fluid line. Before repairing a fluid line damaged in this manner, it is therefore advantageous to remove such rust components or bulges and/or to coat the fluid line to be repaired with a protective film (preliner) prior to restoration.

The invention is explained below in more detail with reference to the attached drawings. In this case, the example embodiment shown by no means limits the variant shown, but serves only to illustrate a principle of the invention.

In all cases, identical or similar components are given the same reference numbers. In order to allow a clear explanation of the functioning of the invention, the figures show only highly simplified schematic diagrams from which the components not essential to the invention are omitted. However, this does not mean that such components are not present in a solution according to the invention.

The figures show the following:

FIG. 1: an example of a cross-section through a composite tube,

FIG. 2: a longitudinal section through a portion of the fluid line to be repaired and a portion of an inversion device and FIG. 3: a section through a repaired fluid line during UV irradiation.

The cross-section through a composite tube 1 shown in FIG. 1 clearly illustrates the basic structure of the tube. The composite tube 1 is composed of a glass fiber textile 3 which is enclosed in a film 4 that completely accommodates it. In this case, the glass fiber textile 3 is composed of a tube produced by a circular knitting process. In the example shown, the film 4 shows a plurality of individual projections 6 on its inner side facing the glass fiber textile 3, which were made in one side of the film 4 by means of gravure roller coating before the film 4 was laid around the glass fiber textile 3. These projections 6 show a spheroidal geometry, i.e. are sphere-shaped, and form an overall coating of hotmelt adhesive 5 on the film 4. For the production of at least partial cohesive bonding between the film 4 and the glass fiber textile 3, a thermally applied rolling process is used in a temperature range of between 70° C. and 90° C., in which the coating of hotmelt adhesive 5 is melted and thus cohesively bonds to the glass fiber textile 3. This unique form of bonding gives rise only partially to a cohesive bond between the film 4 and the glass fiber textile 3 that provides the particular flexibility of a composite tube 1 produced by this method. In the example shown in FIG. 1, the composite tube 1 further has an overlapping area 7. The overlapping area 7 is formed by a section 8 of the inner surface of the film 4 that comes to rest on a corresponding section 9 of the outer surface of the film 4 when the film 4 is completely wrapped around the glass fiber textile 3. In this overlapping area 7, the sections 8, 9 of the film 4 lying atop one another are also bonded to one another by means of a cohesive bond, for which purpose, in the present example, a thermoplastic adhesive film with a melting range above 115° C. is used, said film being melted by an ultrasound sealing process, thus producing the cohesive bond. At the same time, this bond achieves a seal in the overlapping area 7. The composite tube 1 further shows an internal cavity 12, which, however, does not correspond to the throughflow cross-section of the fluid line 2, as the composite tube 1 is turned inside out on insertion of said composite tube 1 into the fluid line 2.

The method for repairing a fluid line 2 can be clearly described with reference to the sectional view of FIG. 2. In order to carry out the process of repairing the fluid line 2, said line is provided with an opening 10, before it is inspected with a camera and the sites to be repaired are measured, through which the composite tube 1 can later also be inserted into the fluid line 2. In order to insert the composite tube 1 into the fluid line 2, an open end of the composite tube 1 is attached to an inversion device 11 so that said tube forms an inversion area 13 in the above-mentioned section. The inversion device 11 has a flanged section 15 for attachment of the inversion area 13 of the composite tube 1. In the example shown in FIG. 2, in order to fix the inversion area 13 in place on the flanged section 15 of the inversion device 11, a clamping means 14 is used, with said means in the present case being a simple fastening clamp. In this type of attachment of the composite tube 1, there is a gap distance 18 inside the inversion device 11 between the inner surface 16 of the flanged section 15 and the outer surface 17 of the composite tube 1, which is useful for applying a pressure p via the inversion device 11 to the clamped end of the composite tube 1. This allows the composite tube 1 to be blown into the fluid line 2. In this case, the applied pressure p is maintained until the polyester resin previously introduced into the glass fiber textile 3 has been completely cured by irradiation with UV light.

The process of curing the polyester resin in the glass fiber textile 3 is shown in FIG. 3. It can be seen from this diagram that the composite tube 1, which has been turned inside out by the applied pressure p, now lies with its glass fiber textile 3 on the inner surface of the fluid line 2, while the film 4 forms the inner surface of the repaired fluid line 2. In this state, the pressure p applied via the inversion device 11 is initially maintained, thus retaining direct, fold-free application of the composite tube 1 over the entire inner wall of the fluid line 2. As the polyester resin used is cured by irradiation with UV light, said irradiation is carried out using a UV emitter 19 in the form of a UV lamp equipped with LEDs that is guided through the fluid line 2. In this case, because of the intensity of the LEDs used, a single irradiation is generally sufficient to completely cure the polyester resin present in the glass fiber textile 3. Here, the UV emitter 19 is accommodated in a mobile frame 20, with the mobility of said frame within the fluid line 2 being ensured by a suitable rolling element 21. Finally, if needed, any branches present in the fluid line 2 are separated using a cutting robot in order to ensure continued unhindered fluid flow inside the existing flow line system. After this process is also completed, the opening 10 of the fluid line 2 repaired in this manner can be re-closed.

LIST OF REFERENCE NUMBERS

1 Composite tube
2 Fluid line
3 Glass fiber textile
4 Film
5 Coating of hotmelt adhesive
6 Projections
7 Overlapping area
8 Section of the inner surface of the film
9 Section of the outer surface of the film
10 Opening of the fluid line
11 Inversion device
12 Internal cavity of the composite tube
13 Inversion area
14 Clamping means
15 Flanged section
16 Inner surface of the flanged section
17 Outer surface of the composite tube
18 Gap distance
19 UV emitter
20 Frame
21 Rolling element

The invention claimed is:

1. A composite tube for repairing leaky fluid lines, consisting of a knit tubular glass fiber textile and of a film fully and sealingly surrounding this glass fiber textile, which is a seamless tube, wherein the film, on its inner side facing the surface of the glass fiber textile, has a plurality of projections of hot melt adhesive which upon melting form a coating of hotmelt adhesive to cohesively bond the film to the glass fiber textile.

2. The composite tube as claimed in claim 1, wherein the knit glass fiber is produced by a circular knitting process to form said seamless tube.

3. The composite tube as claimed in claim 1, wherein the glass fiber textile of the composite tube shows an asymmetrical stretching behavior and a substantially constant material thickness.

4. The composite tube as claimed claim 1, wherein the coating of hotmelt adhesive of the unprocessed film is composed of a plurality of spheroidal or diamond-shaped projections on one side of the film.

5. The composite tube as claimed in claim 1, wherein the coating of hotmelt adhesive of the film is applied to the film by means of gravure roller coating.

6. The composite tube as claimed in claim 1, wherein the glass fiber textile is cohesively bonded to the coating of hotmelt adhesive via a thermally applied rolling process in a temperature range of between 70° C. and 90° C.

7. The composite tube as claimed in claim 1, wherein the film arranged around the glass fiber textile has an overlapping area in which a section of the inner surface of the film lies on a corresponding section of the outer surface of the film and at least one of these surface sections of the film has a thermoplastic adhesive film for the production of cohesive bonding of the film in the overlapping area of the surfaces formed thereby.

8. The composite tube as claimed in claim 7, wherein the thermoplastic adhesive film has multiple layers.

9. The composite tube as claimed in claim 7, wherein the thermoplastic adhesive film has a melting range of more than 115° C.

10. The composite tube as claimed in claim 7, wherein the film is sealingly closed in the overlapping area via an ultrasound and/or heat impulse sealing process.

11. A method for producing a composite tube suitable for repairing leaky fluid lines as claimed in claim 1 comprising the following method steps:
provision of an initially flat film that is cut to size which has a plurality of spheroidal or diamond-shaped projections forming a coating of hotmelt adhesive on one side,
application of a tubular glass fiber textile produced by a knitting method or a weaving method to the side of the film provided with the coating of hotmelt adhesive,
cohesive bonding of the film to the glass fiber textile via a thermally applied rolling process in a temperature range of between 70° C. and 90° C., by means of which the film is adapted to the tube shape of the glass fiber textile,
production of cohesive bonding of an overlapping area of the film by means of an ultrasound and/or heat impulse sealing process, for which purpose the overlapping area is composed of a section of the inner surface of the film that comes to lie on a corresponding section of the outer surface of the film and at least one of these surface sections of the film in the overlapping area of the surfaces has a thermoplastic adhesive film having a melting range above 115° C.

12. The method as claimed in claim 11, further comprising the following method steps:
making of an opening in the fluid line and localization or identification of the damage present in the fluid line,
provision of a length of a composite tube required for the repair consisting of a tubular glass fiber textile and a transparent film bonded cohesively thereto and enclosing the glass fiber textile, wherein the glass fiber textile is first saturated with a styrene-free unsaturated polyester resin that is curable by UV irradiation,
fixation of an open end of the composite tube to an inversion device,
production of a sealed bond between the opening of the fluid line and the composite tube,
insertion of the composite tube into the fluid line or application of excess pressure produced in the inversion device to the composite tube, thus causing the composite tube to be blown into the fluid line to be repaired, wherein as a result of the given pressure, the composite tube lies directly against the inner surface of the fluid line, and
production of UV irradiation at least once over the entire length of the composite tube by means of a UV emitter guided at least once through the composite tube so that the polyester resin is cured.

13. The method as claimed in claim 12, wherein localization and identification of damage present in the fluid line is carried out by scanning with a camera and measurement.

14. The method as claimed in claim 12, wherein the composite tube is provided wound onto a drum as piece goods, and introduced into the fluid line by pulling or blowing in with simultaneous inversion of the composite tube.

15. The method as claimed in claim 12, wherein on blowing of the composite tube into the fluid line, the outer side of the composite tube originally formed by the film, because of the inversion, forms the inner side of the repaired fluid line, and the inner side of the composite tube originally formed by the glass fiber textile lies against the inner wall of the fluid line.

16. The method as claimed in claim 12, wherein in order to improve the inversion behavior of the composite tube, the composite tube is preheated to a temperature between 20° C. and 40° C. before it is inserted into the fluid line.

17. The method as claimed in claim 12, wherein the composite tube prefabricated, i.e., saturated with the polyester resin, on a drum as piece goods is protected from UV light.

18. The method as claimed in claim 12, wherein the fluid line to be repaired is lined with a protective film (preliner) before the beginning of restoration.

19. The composite tube of claim 1, wherein the film is bonded to the knit glass fiber textile at multiple points of contact between the film and the glass textile fiber.

* * * * *